(12) United States Patent
Chaplin et al.

(10) Patent No.: US 11,783,217 B2
(45) Date of Patent: Oct. 10, 2023

(54) QUANTUM CIRCUIT OPTIMIZATION

(71) Applicant: IonQ, Inc., College Park, MD (US)

(72) Inventors: Vandiver Chaplin, Washington, DC (US); Yunseong Nam, North Bethesda, MD (US)

(73) Assignee: IONQ, INC., College Park, MD (US)

(*) Notice: Subject to any disclaimer, the term of this patent is extended or adjusted under 35 U.S.C. 154(b) by 1033 days.

(21) Appl. No.: 16/281,241

(22) Filed: Feb. 21, 2019

(65) Prior Publication Data

US 2020/0272926 A1  Aug. 27, 2020

(51) Int. Cl.
*G06N 10/00* (2022.01)
*G06F 9/38* (2018.01)
*G06F 8/41* (2018.01)

(52) U.S. Cl.
CPC ............ *G06N 10/00* (2019.01); *G06F 8/443* (2013.01); *G06F 9/3885* (2013.01)

(58) Field of Classification Search
CPC ...... G06F 2119/20; G06F 30/32; G06F 8/443; G06F 9/3885; G06F 30/327; G06F 30/337; G06N 10/00
See application file for complete search history.

(56) References Cited

U.S. PATENT DOCUMENTS

| | | |
|---|---|---|
| 2006/0123363 A1 | 6/2006 | Williams |
| 2012/0045136 A1 | 2/2012 | Rose |
| 2013/0152057 A1 | 6/2013 | Ke |
| 2014/0280427 A1 | 9/2014 | Bocharov |
| 2018/0330265 A1* | 11/2018 | Kelly ............... H01L 29/66977 |
| 2020/0184024 A1* | 6/2020 | Nam ..................... G06F 30/327 |

FOREIGN PATENT DOCUMENTS

WO     2017127923 A1     8/2017

OTHER PUBLICATIONS

Maslov et al., "Quantum circuit simplification using templates", Mar. 11, 2005, Design, Automation and Test in Europe, pp. 1-6 (Year: 2005).*

Maslov et al., "Quantum Circuit Simplification and Level Compaction", Mar. 2008, IEEE Transactions on Computer-Aided Design of Integrated Circuits and Systems, vol. 27, No. 3, pp. 436-444 (Year: 2008).*

Miller et al., "A Transformation Based Algorithm for Reversible Logic Synthesis", Jun. 6, 2003, DAC 2003, pp. 318-323. (Year: 2003).*

(Continued)

*Primary Examiner* — Brent Johnston Hoover
(74) *Attorney, Agent, or Firm* — ARENTFOX SCHIFF LLP

(57) ABSTRACT

Technologies are described herein to implement an optimizer that receives portions of a quantum circuit; identifies, from within the received portions of the quantum circuit, a pattern of quantum gates to perform a quantum function; searches a library for a replacement pattern of quantum gates, which is also to perform the quantum function, for the identified pattern of quantum gates; determines that a quantum cost of the replacement pattern of quantum gates is lower than a quantum cost of the identified pattern of quantum gates; and replaces the identified pattern of quantum gates with the replacement pattern of quantum gates.

19 Claims, 10 Drawing Sheets

(56) References Cited

OTHER PUBLICATIONS

Maslov et al., "Toffoli Network Synthesis With Templates", Jun. 2005, IEEE Transactions on Computer-Aided Design of Integrated Circuits and Systems, vol. 4, No. 6, pp. 807-817. (Year: 2005).*

Rahman et al., "An Algorithm for Quantum Template Matching", Dec. 2014, ACM Journal on Emerging Technologies in Computing Systems, vol. 11, No. 3, Article 31, pp. 1-20. (Year: 2014).*

Debnath, S., Linke, N. M., Figgatt, C., Landsman, K. A., Wright, K., & Monroe, C. (2016). Demonstration of a small programmable quantum computer with atomic qubits. Nature, 536 (7614), 63-66.

Maslov, D., Dueck, G. W., Miller, D. M., & Negrevergne, C. (2008). Quantum Circuit Simplification and Level Compaction. IEEE Transactions on Computer-Aided Design of Integrated Circuits and Systems, 27(3), 436-444.

Nam, Y., Ross, N. J., Su, Y., Childs, A. M., & Maslov, D. (2017). Automated optimization of large quantum circuits with continuous parameters. Retrieved from http://arxiv.org/abs/1710.07345.

Maslov, D., Miller, D. M., & Dueck, G. W. (2006). Techniques for the Synthesis of Reversible Toffoli Networks, 1-20. https://doi.org/10.1145/1278349.1278355 http://arxiv.org/abs/quant-ph/0604001.

Szyprowski, M., & Kerntopf, P. (2011). Reducing Quantum Cost in Reversible Toffoli Circuits, 25-26. https://arxiv.org/abs/1105.5831.

\* cited by examiner

325

Example search library to search for templates with only NOT, CNOT, and Toffoli gates.

Example search implementation

QUANTUM CIRCUIT OPTIMIZATION

TECHNICAL FIELD

The embodiments described herein pertain generally to optimizing quantum circuits built by classical processes.

BACKGROUND OF THE INVENTION

A quantum computer is a computational system that uses quantum-mechanical phenomena, such as superposition and entanglement, to process data. Unlike digital computers, in which data is encoded into binary digits (bits) in one of two definite states ("0" or "1"), quantum computation requires data to be encoded into quantum bits (hereafter "qubits"), for which a single qubit may represent a "1," a "0," or any quantum superposition of the two qubit states. In general, a quantum computer with N qubits may be in an arbitrary superposition of up to $2^N$ different states simultaneously, i.e., a pair of qubits may be in any quantum superposition of four states, and three qubits may be in any superposition of eight states.

Large-scale quantum computers solve certain problems much more quickly than digital computers (alternatively referred to herein as "classical computers"). In the operation of a quantum computer, computations may be initialized by setting qubits in a controlled initial state. By manipulating those qubits, predetermined sequences of quantum logic gates are realized that represent a solution to the problem to be solved, called a quantum algorithm. Quantum algorithms, such as Shor's algorithm, Simon's algorithm, etc., can run more efficiently than any possible classical algorithm.

Based on the inherent advantages in quantum computers in solving certain problems, the challenge is in programming quantum computers to take advantage of their strengths in an efficient and cost-effective manner.

SUMMARY OF THE INVENTION

In one example embodiment, a method to optimize a quantum circuit includes identifying a set of quantum circuit gates that are intended to perform a function; finding, from a library of templates, a template of quantum circuit gates that also perform that function; and replacing the identified set of quantum circuit gates with the template of quantum circuit gates.

In another example embodiment, a computer-readable medium stores instructions that, upon execution, cause a digital computing processor to receive portions of a quantum circuit; identify, from within the received portions of the quantum circuit, a pattern of quantum gates that match part of a pattern from a previously generated library of templates; search the library of templates for a replacement pattern of quantum gates; determine that a quantum cost of the replacement pattern of quantum gates is lower than a quantum cost of the identified pattern of quantum gates; and replace the identified pattern of quantum gates with the replacement pattern of quantum gates.

In yet another embodiment, an optimizer includes: a quantum circuit analyzer to identify a pattern of quantum gates that match at least a part of a pattern from a previously generated library of templates; the library of templates to: execute an algorithm to search for a replacement pattern of quantum gates, identify a replacement pattern of quantum gates to replace the identified pattern of quantum gates, when a quantum cost of the replacement pattern of quantum gates is determined to be less than a quantum cost of the identified pattern of quantum gates, and replace the identified pattern of quantum gates with the replacement pattern of quantum gates.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION OF THE PREFERRED EMBODIMENT

Figure 1:
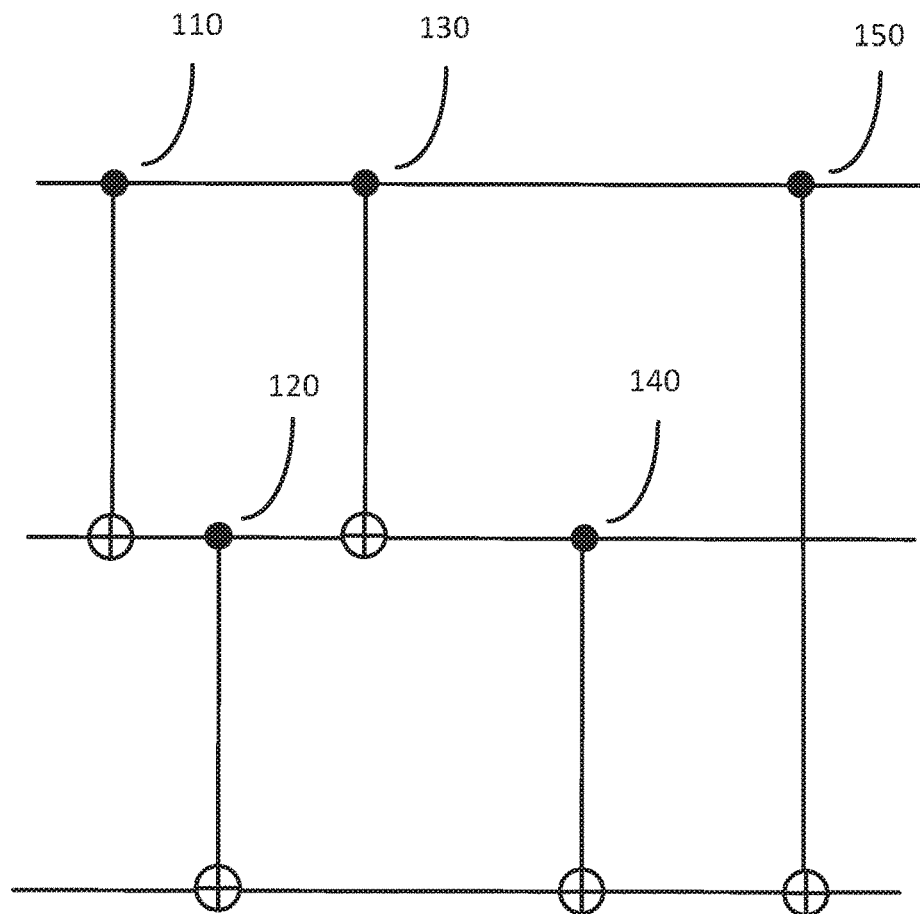
FIG. 1 shows a quantum circuit diagram that represents an example embodiment of a template having multiple elements, as described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Described herein are approaches embodied in one or more of systems, apparatuses, applications, programs, and methods by which quantum circuits are simplified by an algorithmic synthesis of quantum gate templates using, e.g., a map-and-replace technique.

In the present description, the following terms may be used, in addition to their accepted meaning, as follows:

"Classical computing," "classical program," "digital computing," "digital program," or variations thereof may refer to computing/processirig of data that has been converted into binary numbers. Classical computing processors may include, but not be limited to, a central processing unit (CPU), a graphical processing unit (GPU), a tensor processing unit (TPU), application-specific integrated circuits (ASICs), field programmable gate arrays, etc., and unbound permutations thereof. Non-limiting examples thereof may include a classical optimization function that may be parallelized and run on a multicore classical computer; a classical computer with a GPU for performing parallel calculations, etc.

"Quantum computing," or variations thereof, may refer to computing/processing of data that has been encoded into qubits. Quantum computing utilizes qubits to perform computations to produce results that can be dramatically faster than classical computing or make classically computationally intractable problems tractable. The embodiments described herein certainly contemplate implementation in even faster and more efficient quantum computing systems as technologies evolve.

"Environment" may refer to a computing environment in which are found components that, when executing a program, may utilize, e.g., utilities such as libraries, other programs, other hardware, etc. Thus, reference may be made herein to a classical computing environment, a quantum computing environment, etc.

A "quantum gate" may refer to a controlled interaction that manipulates the state and/or phase of qubits in a quantum computing system, thus changing the system's information content.

A "quantum circuit" may refer to a sequence of quantum gate operations that act on a set of qubits. The name historically comes from quantum algorithms being expressed as a series of quantum logic gates, analogous to classical logic gates in traditional circuit design.

Quantum information processing (QIP) algorithms may be represented using quantum circuits. Abstract gate operations have been utilized for the design and construction of QIP algorithms which, when implemented at a physical level, must be compiled into a set of hardware-specific operations that manipulate qubit states. Within this context, a logical gate may refer to an abstract, design-oriented operation, whereas a physical gate may refer to a hardware-specific implementation.

Generally, there may be multiple (non-unique) expressions of an algorithm's functionality in logical gates. For a given quantum circuit, there may be other logical representations that express the same functionality, to within a global phase factor. Although these circuits may be mathematically equivalent to one another for quantum computation purposes, their respective performance characteristics may differ when implemented in actual hardware. That is, while there may be multiple equivalent circuits that induce the same computational state evolution, some practical representations may work better than others when mapped to physical gates.

"Quantum cost" may refer to an expected performance penalty of a logical circuit mapped and executed as physical gates; thus, logical representations of a quantum circuit regarded as having lower performance are said to have higher quantum cost.

Accordingly, the optimizer implementations disclosed and recited herein reduce expected cost by manipulating one or more circuit representations. The apparatuses, components, systems, methods, and programs described herein pertain to a classical computing optimizer that transforms an abstract circuit into a logically identical representation that has lower quantum cost, and hence is more appropriate for quantum processing.

The process by which logical gates are mapped to physical gates may be referred to as the compiler step, or compilation. The process of choosing a preferred, i.e., lowest cost, logical representation may be referred to as optimization. The quantum cost of each logical gate sequence may depend on the methodology of the compilation step. Thus, when considering optimization of logical circuits, a consistent compilation process and, hence, a consistent definition of the quantum cost function may be assumed for optimization.

In accordance with the example embodiments described herein, quantum computing may include executing iterative processes by which one or more quantum circuits may be written in a classical computing environment for execution in a quantum computing environment. Non-limiting examples of such classical computing environment that can be used include a desktop computer, a laptop computer, mobile device, a virtual-reality environment, etc. The quantum circuit may be submitted via a network, e.g., the Internet, to a quantum computing device at which the one or more quantum circuits may be queued with other quantum circuits, similar to, for example, batch processing for a mainframe computing device. The queued quantum circuits may be executed in turn.

As set forth above, a QIP algorithm may be variously represented by different quantum circuits that nonetheless describe the same functionality. In theory, a quantum computer capable of executing these various circuit representations of the same algorithm without error, decoherence, noise, etc., faithfully yields identical results. Practically, however, a physical quantum computing system may be more error-prone under one representation relative to another, resulting in different results with varying degrees of agreement with the ideal result. Thus, a compiler of arbitrary quantum programs, one designed using logical gates and submitted for execution on a quantum computer, may benefit from cost-reduction by first transforming the logical circuit to a lower cost representation.

Accordingly, the implementations described herein may include finding sub-lists of gates, i.e., patterns, in the main circuit whose operation may be improved by replacing the patterns with a set of gates that achieve better physical results, i.e., with reduced quantum cost, but whose logical functionality is otherwise equivalent. These search-and-replace patterns are presentations of a previously generated template identity, i.e., a template.

As referenced herein, a template may be regarded as a list of gates that has no net effect on quantum system state in an ideal system; that is, an identity operation, e.g., two NOT gates in series being equivalent to a non-operation. Templates may also be regarded as a list of gates that form an identity within a global phase. Non-trivial templates with many gates spanning multiple qubits may be pre-generated and utilized to reduce an input circuit to an identical circuit with fewer gates and/or a circuit solution that is more computationally efficient or cost effective. A template is typically defined as a ring of gates because, when a product of unitary operators $U_1 U_2 \ldots U_N$ evaluates to identity, where $U_n$ for n=1, 2, ... N denotes the nth operator, any cyclic permutation of the product is also an identity.

FIG. 1 shows a quantum circuit diagram 100 that represents an example of a template having multiple elements, as described herein. CNOT gates 110, 120, 130, 140, and 150 are represented by symbol ⊕, which represents a NOT gate, connecting to a solid circle, which represents the control. The embodiments and implementations described and recited herein are not limited in quantity to those depicted in FIG. 1.

Template 100 evaluates to an identity operation. That is, in the non-limiting example embodiment of FIG. 1, CNOT gates 110, 120, and 130 may be replaced with the inverse of the remaining part of the circuit, which includes CNOT gates 140 and 150. This is a straightforward extension of the functionality of an identity operation since a product of two operators being an identity implies that one operator is the inverse of the other.

Example template 100 may serve to reduce, by one, the number of CNOT gates in an arbitrary input quantum circuit with the quantum gate pattern that matches the three first CNOT gate pattern 110, 120, and 130, effectively replacing the gate pattern with the inverse of the sub-circuit that includes CNOT gates 140 and 150. The more the patterns occur in the input quantum circuit, the more the quantum gate count reduces, by the application of template-based quantum circuit optimization, as described and recited herein. The number of quantum gates may be regarded as an example of quantum cost.

The need for classical computing efficiency of the template-based optimization is imperative since input quantum circuits may potentially include many known gate patterns, and require management in a timely manner. To efficiently identify known patterns, a directed acyclic graph (DAG) representation of the quantum circuit may be produced to expose gate connectivity patterns along a chosen qubit line.

To identify a sub-circuit in an input circuit that matches a given template circuit, two mappings, i.e., qubit mapping and gate mapping, are performed. A qubit mapping includes matching qubit labels between an input circuit and a template circuit. A gate mapping includes matching a type and ordering of the quantum gate, defined over the DAG representation of the circuit, between the input circuit and the template circuit. When the two mappings are completed, an identification may be made, and the tern plate-based optimization may be applied.

Figure 7:
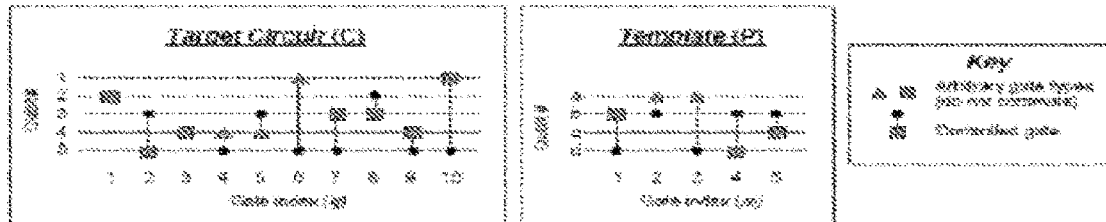
FIG. 7 is an illustration of an example of qubit mapping from template to circuit in accordance with at least some embodiments described herein.
Figure 7:
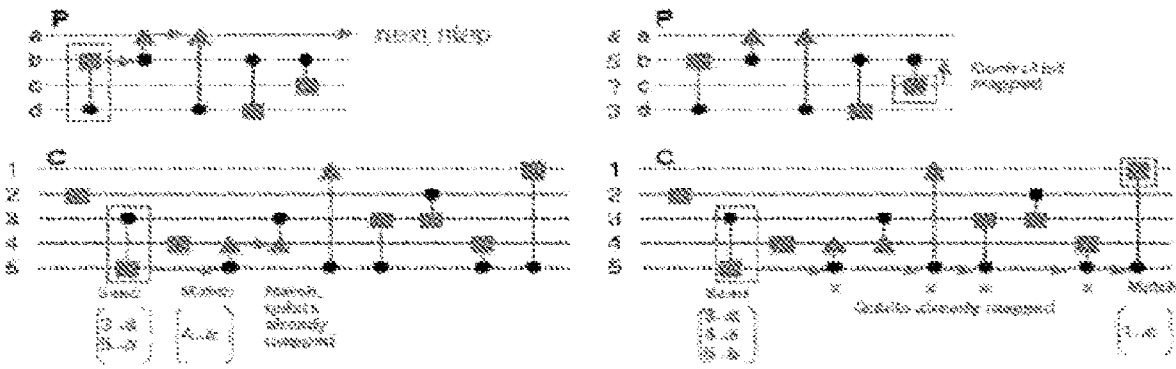
Figure 7:
Figure 8:
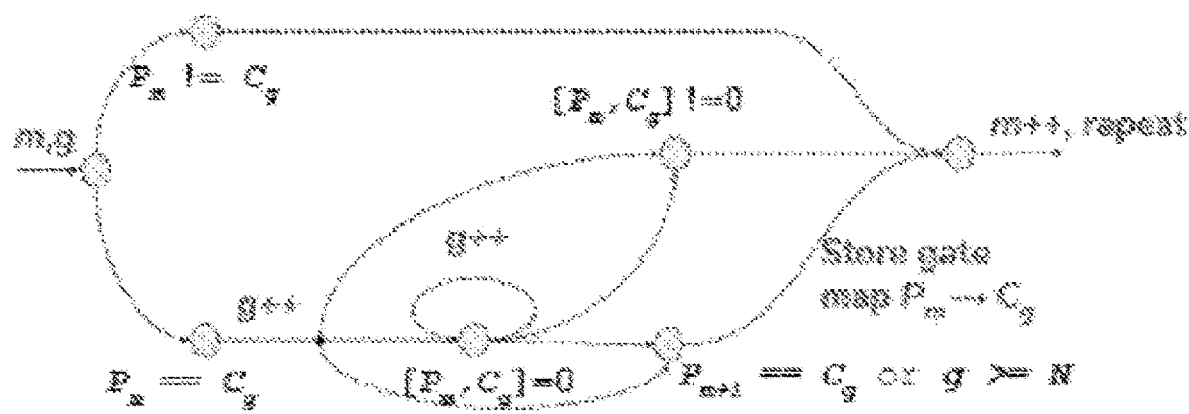
FIG. 8 is an illustration of an example of a gate pattern match in accordance with at least some embodiments described herein.

As an example of the identification, and to contextualize embodiments and implementations described above, example illustrations 1 and 2 are depicted in FIGS. 7 and 8, respectively.

In particular, FIG. 7 provides an illustration 1, which illustrates an example of qubit mapping from template to circuit.

Moreover, FIG. 8 provides an illustration 2, which illustrates an example of a gate pattern match.

The examples of illustrations 1 and 2 as shown in FIGS. 7 and 8, respectively, generally pertain to the scanning of an input circuit, identifying matches with stored templates, and substituting stored templates for identified patterns to reduce quantum cost.

The matching may be implemented as a DAG search that builds candidate mapping from template qubits into circuit qubits. To pattern match the template on to gates of the input circuit, a non-deterministic finite automaton, i.e., NFA, may evaluate gate mappings prior to replacement. An NFA based on regular expression matching may be used to compute gate mapping.

Figure 2A:
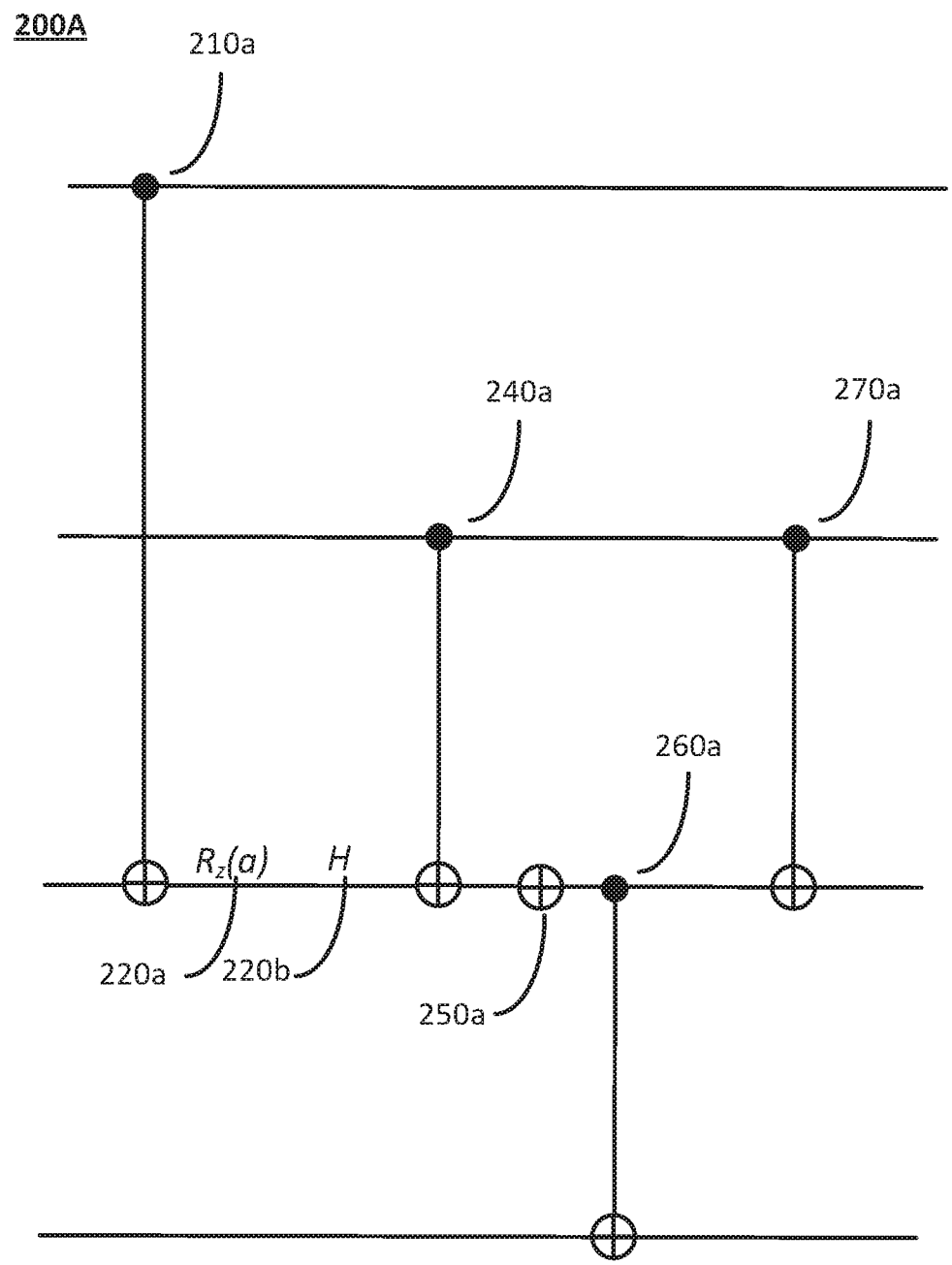
FIG. 2A shows a quantum circuit diagram that represents an example embodiment of an input circuit having multiple elements, as described herein.

FIG. 2A shows a quantum circuit diagram 200a that represents an example of an input circuit having multiple elements including CNOT gates 210a, 240a, 260a, 270a; in which $R_z(a)$ corresponds to a single-qubit z-rotation gate by angle a ($R_z(a)$ 220a), H denotes a Hadamard gate (H 230a), and corresponds to a single-qubit NOT gate 250a.

To identify a sub-circuit in circuit 200a that matches an example template 100, CNOT gate 240a may be considered as a seed gate, in a non-limiting example. The qubit mapping, according to the choice of seed gate in this example, reads that the first and second qubits in the template 100 map to the second and third qubits in the example input circuit 200a, respectively. Performing a DAG search to the right from the seed gate 240a, along the third qubit line from the top in the circuit 200a as the qubit line that the target of the CNOT gate 240a is applied to, the next quantum gate of the NOT gate 250a is encountered. Using a commutation rule, it may be determined that CNOT gate 240a commutes with NOT gate 250a. Therefore, the identification process does not terminate, although NOT gate 250a is not a part of the pattern that is to be identified, according to the example template 100, since it has been determined that non-matching gate 250a may be commuted such that there is a chance that the seed gate 240a may still be used to form the template pattern 100. Continuing the DAG search along the same, third qubit line in the circuit 200a, CNOT gates 260a and 270a that conform to the desired pattern 100 are found, while successfully mapping, i.e., qubit-mapping, the third and last qubit in template 100 to the fourth and last qubit in circuit 200a, and the identification process may terminate since the identified pattern of gates 240a, 260a, and 270a match the majority (3) of the desired template 100 according to both qubit and gate mappings.

The identification process may be performed for one template at a time or for multiple templates in parallel. In accordance with at least some example implementations, the identification process may be implemented as a DAG search that builds candidate mapping from template circuits to input circuits, or vice versa. That is, the identification process may also be implemented by applying the mappings from the input circuit to the known set of templates.

Figure 2B:
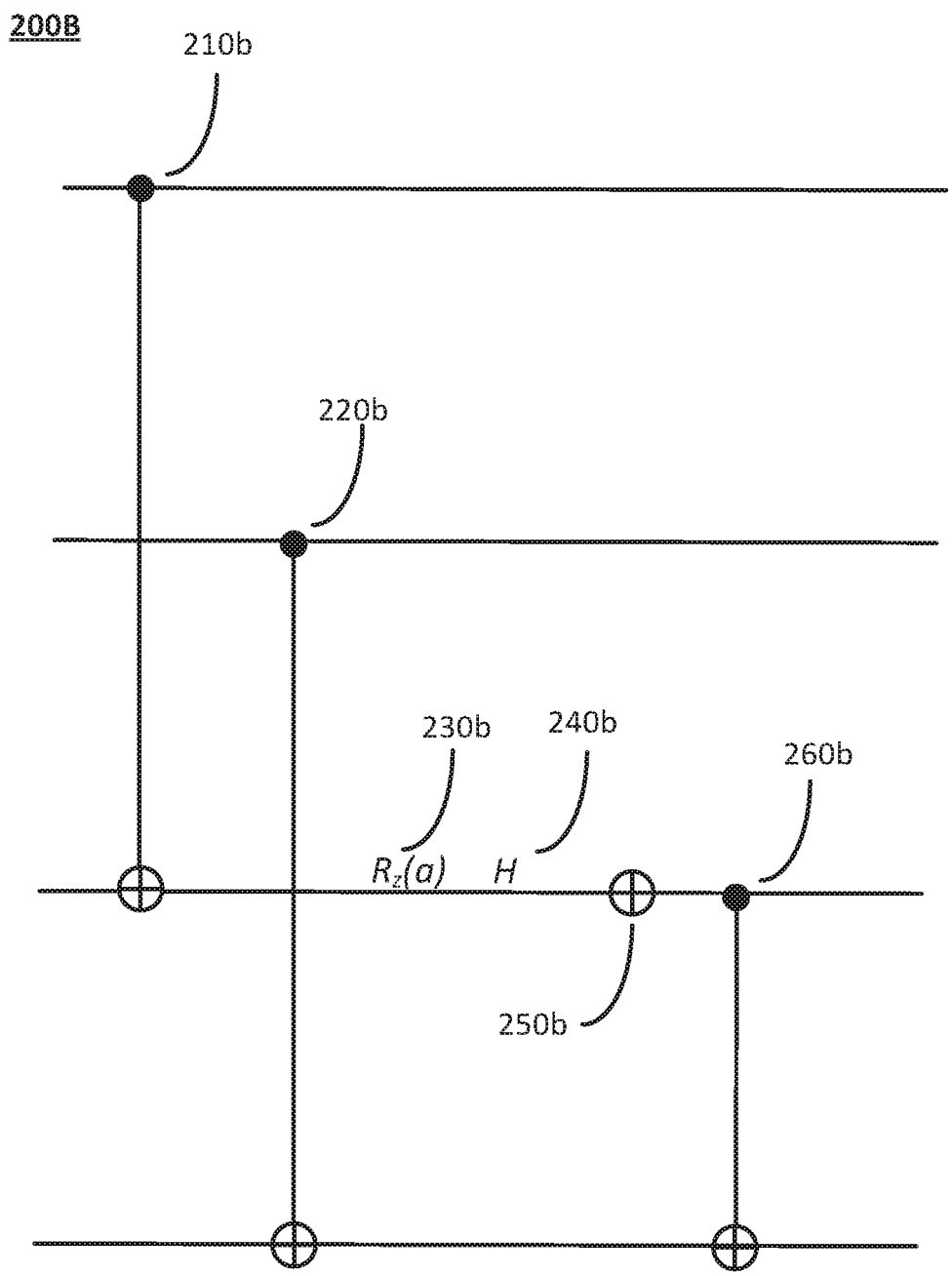
FIG. 2B shows a circuit diagram that represents an optimized circuit obtained by template-based optimization, according to at least some implementations described herein.

FIG. 2B shows a circuit diagram 200b that represents an optimized circuit obtained by applying template-based optimization using template 100 relative to the above identified pattern in circuit 200a. The identified pattern of gates 240a, 260a, and 270a may be replaced with a lower-cost circuit that includes gates 220b and 260b. This amounts to a reduction of the number of CNOT gates from 3 to 2. Because the CNOT gate 220b acts on the second and fourth qubit lines of the circuit 200b, it may be commuted through any gates that are not acting on the second and fourth qubit lines of the circuit 200b. Gates 230b, 240b, and 250b are single-qubit gates that may be applied to the third qubit line of the circuit 200b. Therefore, CNOT gate 220b may be placed anywhere between the CNOT gate 210b and the CNOT gate 260b.

Another quantum cost metric that may be used is a quantum circuit depth. Note that circuit execution time is an important consideration in quantum computation performance because the accrual of certain errors such as timing, laser amplitude and phase errors, systematic errors such as field drift and heating, and the likelihood for complete state decoherence all increase over time. Thus, a second heuristic of circuit performance, in addition to the sum of quantum costs of each gates, may include significantly reducing, or even minimizing, circuit execution time. While actual execution time may depend on hardware-level parameters, circuit depth, which may be regarded as the longest connected path from circuit beginning to end, may be used to estimate the execution time.

Circuit depth may be computed by determining the longest path in the DAG representation of the circuit, with length being regarded as the number of gates encountered on each path, the sum of quantum cost along the path, or some other constructed value. An entangling gate may induce qubit connectivity between each respective pair of entangled qubits, i.e., vertical lines between qubits in a circuit diagram; but with a fully-connected topology available, certain qubits may be entangled in parallel rather than the sequential entanglement customary in current quantum algorithm design. Commuting one or more pair-wise gates forward and merging them into a single parallel operation with one or more pair-wise gates may reduce circuit depth. Such operations may be represented, for example, as templates having two or more regular entangling gates followed by the parallel version. As a yet another example, the template-based optimization described above that was performed on the circuit 210a that outputs the optimized circuit 210b shows that the entangling gates 210b and 220b may be implemented in parallel. The two-qubit circuit depth of the pre-optimization circuit 210a is 4, which may be compared with the post-optimization circuit depth 2 of the post-optimization circuit 210b, thus reducing the circuit depth from 4 to 2. Accordingly, solutions described explicitly and implicitly herein may be applied to circuit depth reduction via parallel gates.

Because the template-based optimization may alter the topology of the qubit connectivity, it can be used, for example, in tandem with quantum circuit optimizers that preserve the connectivity topology to facilitate further circuit optimization in the quantum cost, including both the number of gates and the circuit depth, when underlying target quantum hardware for which the optimized circuit is to be implemented is able to natively implement the newly-introduced connectivity. That is, the optimization described and recited herein may be applied in a pipeline in combination with quantum circuit compilation and additional quantum circuit optimization methods. Multiple iterations between the different quantum circuit optimizers, including the template-based optimizer, may be performed until, e.g., no further optimization over a quantum cost may be achieved, so as to output an optimized circuit for a given optimization strategy.

The all-to-all connectivity of trapped ions allows for efficient implementation of quantum circuits that either include, or may be transformed to include, parallel gates. Parallel gates are a generalization of two-qubit quantum entangling gates. A standard entangling gate, e.g., a Maimer-Sorensen or "MS" gate, may operate on a single pair of qubits to create a non-separable superposition of the multi-qubit states. Such operations are utilized in quantum algorithms to explore complex problem domains infeasible in classical computing.

A parallel gate may act simultaneously on multiple pairs, as opposed to a single pair. A challenge associated with implementing entangling gates in parallel is to operate on qubits of interest, while leaving the all other pairs unaffected. Performing entanglements in parallel may be, at most, as costly as a constant times that of the single-pair performance cost. Therefore, parallel gates offer a second optimizer function of reducing the aggregate quantum resource requirement for circuit execution. Furthermore, the all-to-all connectivity of the trapped-ion quantum computer allows for a simultaneous implementation of entangling gates between multiple arbitrary pairs.

In connection with the quantum cost reduction demonstrated for example in FIG. 2A and FIG. 2B, described and recited herein are methods to generate a library of templates. An example implementation of the generator using the breadth-first search (BFS) is depicted in FIG. 9.

Figure 9:
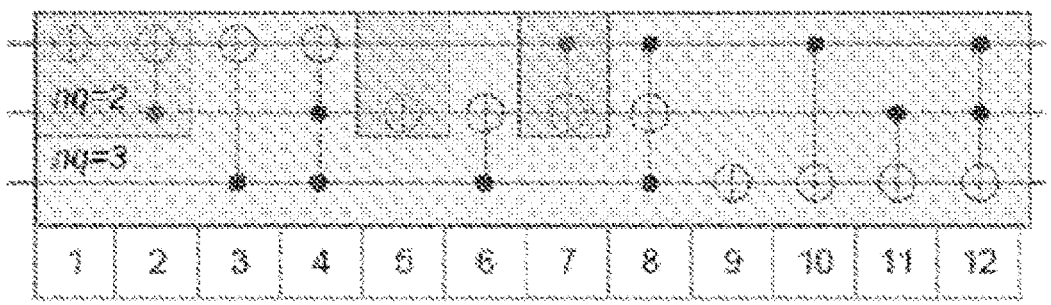
FIG. 9 is an example implementation of the generator using the breadth-first search (BFS) in accordance with at least some embodiments described herein.
Figure 9:
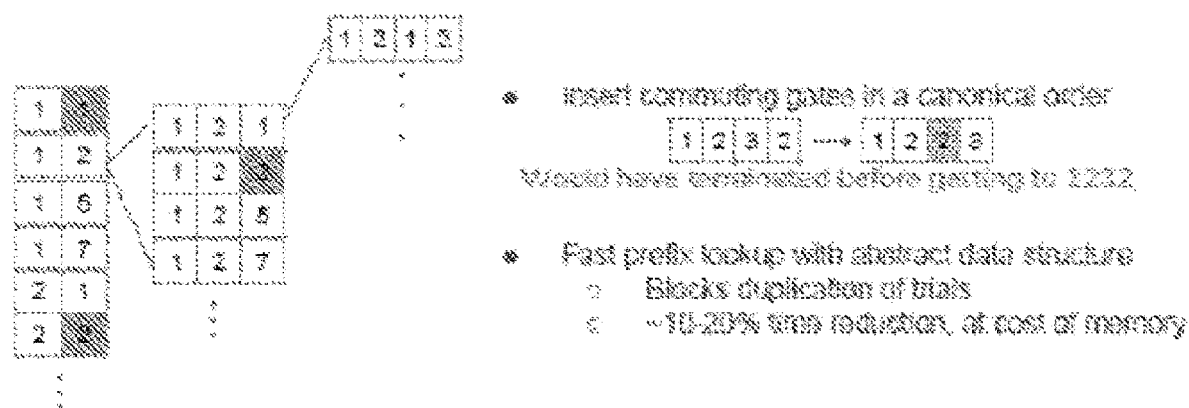

As shown in the example in FIG. 9, the BFS for the template library generation may be performed by choosing the number of qubits that the template is to be generated over. For a chosen number of qubits, a set of possible gates that is chosen to be considered for the template library generation is created. Referring to the chosen gates for the template library generation as bare gates, the BFS starts by considering every bare gate at the first child level, where the root of the tree is empty. The library generation then checks every complete branch, defined according to a branch that starts from the root to a leaf, to determine if any, i.e., the product of all bare gates in the path of the complete branch in the order of appearance along the branch, results in identity. If the branch of interest does not evaluate to identity, the search continues along the branch. If the branch of interest evaluates to identity, the search terminates on the branch, and the product of the bare gates corresponding to the branch is recorded as a template in the template library. When all branches at the given level are checked, if there are any remaining branches that are not terminated, the next child is added to those branches. The BFS terminates once there exists no more branches left for further search and all branches are accounted for the generation of the template library.

In one example, the BFS method described above may be optimized to reduce the runtime cost of the BFS. For example, when a child level is added, the template-based optimization may be applied to all complete branches with the templates stored in the template library at the time of the BFS. If any of the branches admit the template-based optimization, e.g., T, the branch may be eliminated from the search, since such a branch represents a suboptimal template. That is, if the search along the branch continues, this branch leads to templates of the form $U_1 U_2 U_3 \ldots U_m U_{m+1} \ldots U_{m+M} U_{m+M+1} \ldots U_N$, in which $U_{m+1} \ldots U_{m+M}$ is the identified template T, and thus a shorter, optimal template $U_1 U_2 U_3 \ldots U_m U_{m+M+1} \ldots U_N$ may replace the suboptimal template during application of the template-based optimization of an input quantum circuit by virtue of first considering the template $U_{m+1} \ldots U_{m+M}$ then considering the template $U_1 U_2 U_3 \ldots U_m U_{m+M+1} \ldots U_N$. This dramatically reduces the computational overhead in the BFS.

The BFS may be repeated an arbitrary number of times to search for templates of any number of qubits. To aid the larger number qubit search, the previous, smaller number qubit search tree may be held in memory, and thus all newly found templates may be used as a part of the template library that helps reduce the computational overhead for subsequent searches. Therefore, while search space may be represented as a tree that grows exponentially in the template length for a given number of qubits and a fixed number of bare gates considered, many growing search paths may be found to be equivalent to previously searched templates. Accordingly, a check against previously found templates may reduce the problem size to one that is more manageable. This cycle may terminate after a predetermined amount of time or iterations.

Figure 3:
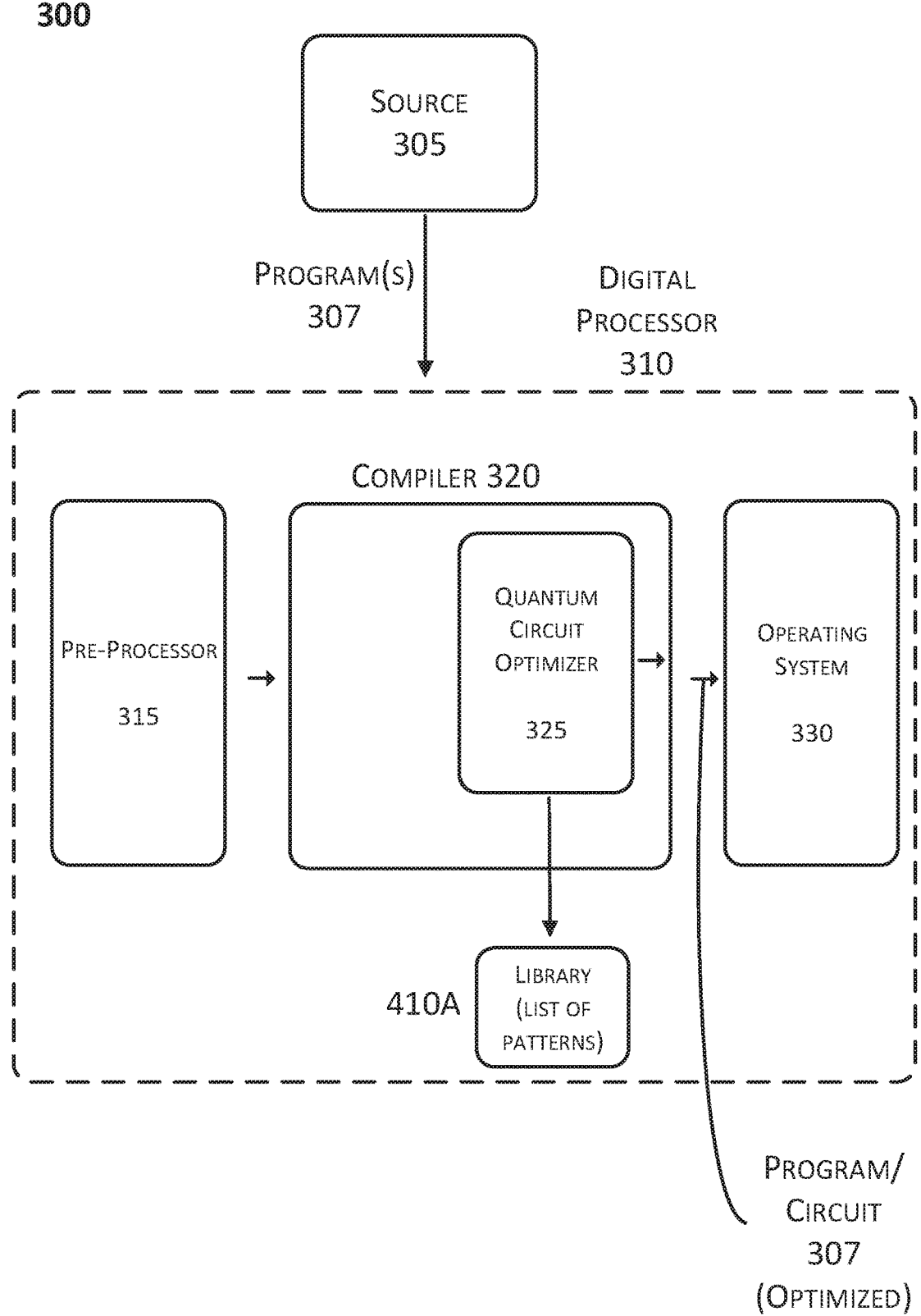
FIG. 3 shows a block diagram representing an example classical computing system by which a quantum circuit is optimized, arranged in accordance with at least some embodiments described herein.

FIG. 3 shows a block diagram representing an example classical computing system 300 by which a quantum circuit may be optimized, arranged in accordance with at least some embodiments described herein. As depicted, configuration 300 includes at least a program source 305, program(s) 307, and digital processor 310. Digital processor 310 may include, at least, pre-processor 315, compiler 320 including quantum circuit optimizer 325, and operating system 330. In accordance with at least some embodiments described herein, library 410A may be associated with quantum circuit optimizer 325.

Source 305 may refer to one of multiple servers that may be hosted on a cloud-based infrastructure via which program(s) 307 may be received from a user or user entity over a network. Source 305 may be further configured to receive and/or store partial or complete results of the execution of program(s) 307 and return such results to the user or user entity, also via the network. Further, source 305 may be implemented by single or multiple machines, and program(s) 307 may be transmitted across single or multiple connections or channels.

Program(s) 307 may refer to one or more programs received from a user or user entity, via source 305. Program(s) 307 may include at least one or more quantum circuits written or programmed in a classical environment intended for execution in a quantum computing environment. Respective ones of program(s) 307 may be written or programmed in-part or entirely in any quantum computing language, include only quantum circuits, or include quantum circuits in combination with classical computing functions. Unless context otherwise requires, the description will continue with reference to a single embodiment of program 307, but without excluding embodiments and implementations that include multiple programs.

Digital processor 310 may refer to one or more embodiments of a classical computing environment that may be, or include, a classical computer, processing device, and/or even individual processors, on which program 307 is assembled, managed, and/or executed. Digital processor 310 may refer to a high-performance computing (HPC) environment that includes, at least, a CPU and GPU that is present on a, e.g., a video card, embedded on a motherboard, or on the CPU die. Optimization of quantum circuits, according to embodiments described herein, may be executed in its entirety on the CPU or in part on the CPU and the GPU. Alternative embodiments may be executed in evolved HPC components equivalent to those described herein.

Pre-processor 315 may refer to a program that is designed, programmed, or otherwise configured to modify input data to conform with input requirements of another program. In accordance with the embodiments described herein, the input to pre-processor 315 includes at least portions of program 307, which may include one or more quantum circuits. The output may be referred to as a preprocessed form of the input data, i.e., program 307, that may be used or executed by other programs on digital processor 310. In accordance with the embodiments described herein, pre-processor 315 may pre-process or otherwise translate the source code by which program 307 is written in preparation for compilation.

Compiler 320 may refer to an optimizing compiler that is designed, programmed, or otherwise configured to render at least portions of program 307 suitable for execution in a quantum environment. As is known in the art, compilers may execute operations that promote efficient design and correct transformations of source input to target output. Thus, compiler 320 may be designed, programmed, or otherwise configured to minimize or maximize some attributes of program 307, i.e., reduce quantum cost. To that end, compiler 320 includes or is associated with quantum circuit optimizer 325, which implements quantum circuit optimization using algorithms that may transform one or more quantum circuits included in program 307 into, respectively, a corresponding quantum circuit that is functionally equivalent but at a lower quantum cost.

Quantum circuit optimizer 325 may be designed, programmed, or otherwise configured to identify a pattern of quantum circuit gates in program 307 that are intended to perform a function, search template library 410A for a template of quantum circuit gates that also perform the function at a lower quantum cost, and replace the identified set of quantum circuit gates with the template of quantum circuit gates.

In accordance with at least some implementations, quantum circuit optimizer 325 may map template patterns stored in library 410A onto one or more identified patterns of quantum gates in program 307. As referenced herein, a pattern match may include both qubit and gate mapping. If a non-commuting gate is encountered during a pattern identification process, the process may terminate and the next template may be mapped onto the input circuit corresponding to program 307. The procedure described by the quantum circuit optimizer 325 may perform both mapping from pattern qubits to circuit qubits as well as mapping of pattern gates to circuit gates, both of which may be utilized to identify a given pattern functionality from within a subregion of a circuit.

When implementing a circuit modification algorithm, a determination may be made as to which gates commute. Generally, specific rules for which gates commute may be documented, including commutation rules for a gate that commutes with a group of gates. However, rather than hard-coding commutation rules, which may be a default in some implementations, commutation relations may be defined in a dictionary type structure and modified offline, thus facilitating fast lookup, arbitrary modification online or offline, and simplicity of use from multiple software packages.

In accordance with at least one embodiment, quantum circuit optimizer 325 may be designed, programmed, or otherwise configured to receive at least portions of program 307, identify a pattern of quantum gates therein that are programmed to perform a quantum function, search a library for a replacement template of quantum gates that are also programmed to perform the quantum function, determine whether a quantum cost of the replacement template of quantum gates is lower than a quantum cost of the identified pattern of quantum gates, and, assuming the determination is positive, replace the identified pattern of quantum gates with the replacement template of quantum gates.

Operating system (OS) 330 may be designed, programmed, or otherwise configured to control classical computing software and hardware components. Thus, in accordance with at least some embodiments of quantum circuit optimization, OS 330 may receive optimized program 307, schedule and/or prioritize processing for functions thereof, including assigning functions to job queues for ultimate execution on a QPU, and initiate execution thereof.

The solutions described explicitly and implicitly herein include an automated process of running a quantum algorithm through an optimizer to reduce quantum cost. The optimizer may produce an equivalent circuit that, when implemented, has a lower chance of, for instance, decoherence of the quantum computational state.

Figure 4:
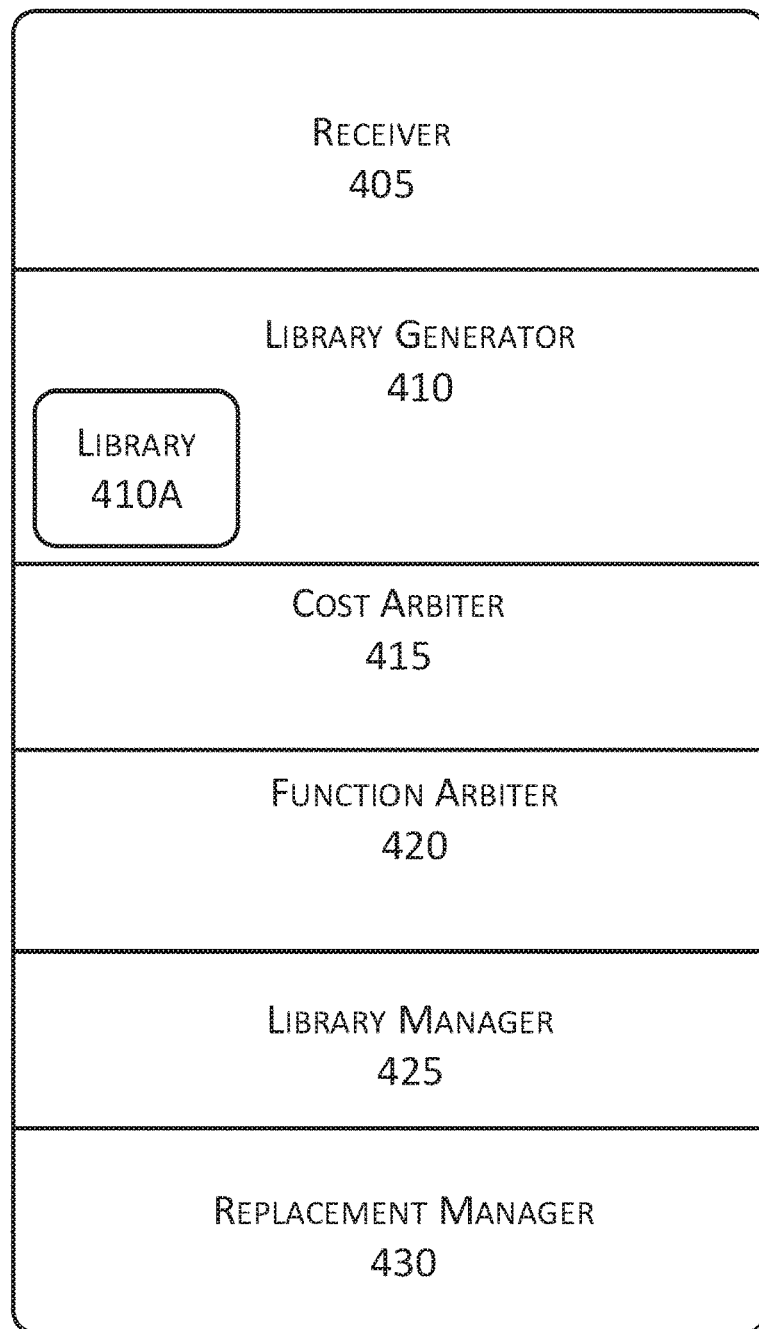
FIG. 4 shows a block diagram representing an example classical computing system optimizer, arranged in accordance with at least some embodiments described herein.

FIG. 4 shows an example configuration of quantum circuit optimizer 325 by which optimization of quantum circuits may be implemented, arranged in accordance with at least some embodiments described herein. As depicted, quantum circuit optimizer 325 is included in or associated with optimizing compiler 320; and quantum circuit optimizer 325 includes at least receiver 405, library generator 410, cost arbiter 415, function arbiter 420, library manager 425, and replacement manager 430. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Receiver 405 may be designed, configured, or otherwise programmed to receive program 107, which includes one or more quantum circuits written or programmed in a classical environment intended for execution in a quantum computing environment.

Library generator 410 may be designed, configured, or otherwise programed to generate library 410A using the BFS approach. The library generator 410 may have inserted therein constructed permutations into a tree for which a root node is a bare gate type. New first level nodes are instances of the different bare gates, thus increasing the breadth of the tree. The library generator 410 may also repeat such process for any number of qubits, and the larger number qubit instance may benefit from holding the templates found in the smaller number qubit instance in memory.

Cost arbiter 415 may be designed, configured, or otherwise programmed to utilize a algorithm to determine the quantum cost of templates stored in library 410A as well as the patterns identified in program 307. Quantum costs, as referenced herein, may pertain to a customized dictionary implementation of efficiencies and resource spending for gates and arbitrary sequences of gates. Gate costs may be stored, e.g., as key-value pairs accessible in constant time via hashing, though such implementation is not limiting. A customized scoring scale may be used to assign costs to gates and/or sequences of gates, with greater numbers indicating cost. Thus, in accordance with at least one example implementation, single-gates may have comparatively low cost, but CNOT/two-qubit gates may have higher costs associated therewith. There may be dynamic or offline adjustments of quantum cost for a gate or sequence of gates based on experimental results or actual experience. When replacement manager 425 is to replace an identified pattern of gates from program 307 with a template from library 410A, constant-time lookup precludes performance penalty.

In accordance with at least some implementations, cost arbiter 415 may determine a quantum cost of respective templates in library 410A, as the templates are generated or stored. Then, cost arbiter 415 may also determine a quantum cost of respective patterns in program 307, upon identification by function arbiter, as referenced below.

Function arbiter 420 may be designed, configured, or otherwise programmed to perform a pattern search within received program 307, and perform a trial mapping of one or more templates into program 307, i.e., one or more target circuits. The search, or mapping, may be performed for one function at a time or for multiple functions in parallel. Further, the search, or mapping may depend in part on a search over a directed acyclic graph, i.e., DAG, representation of a quantum circuit, building candidate mappings from template qubits into circuit qubits.

Library manager 425 may be designed, configured, or otherwise programmed to search library 410A to determine whether there are stored therein templates equivalent in functionality to patterns identified in received program 307 by function arbiter 420; that is, to determine whether the qubits of a template stored in library 410A may be mapped to the qubits of at least one quantum circuit corresponding to program 307, such that the gates of the template may be mapped to gates of program 307. If the determination is positive, that is the quantum circuit optimizer 325 that implements a fast technique for pattern matching the stored template to a sub-set of gates corresponding to program 307 via, for example, a non-deterministic finite automaton, i.e., NFA. Template-based optimization may be applied to reduce the quantum cost of the input quantum circuit.

According to at least one implementation, library manager 425 may search library 410A for a template so that an identified pattern within program 307 may be replaced by a lower-cost sequence. The pattern may be identifiable only if certain gate commutators are applied, using an efficient implementation for storing, reading, and evaluating gate commutation relations, as described herein. Rather than hard-coding the gate commutation rules, commutation relations may be defined in an abstract data structure, such as a dictionary or prefix tree, and modified offline, facilitating fast lookup, arbitrary modification online or offline, and simplicity of use from multiple software packages.

Replacement manager 430 may be designed, configured, or otherwise programmed to facilitate topology-mutation via templates by, e.g., modifying the topology of program 307. For example, a quantum SWAP gate, which swaps the state of two qubits, may be implemented at a substantial savings on a trapped-ion system as a logical-qubit reassignment, because a SWAP gate may include three CNOT gates in an exemplary implementation. Logical reassignment/remapping, readily available for a trapped-ion system that may leverage all-to-all connectivity is low cost since the remapping in this system incurs zero quantum cost. Thus, when the three CNOT gates that act as a SWAP gate are identified in an input circuit during optimizing compilation, replacement manager 430 may remove the identified template and switch the qubits for the of the remaining gates in the input circuit.

Figure 5:
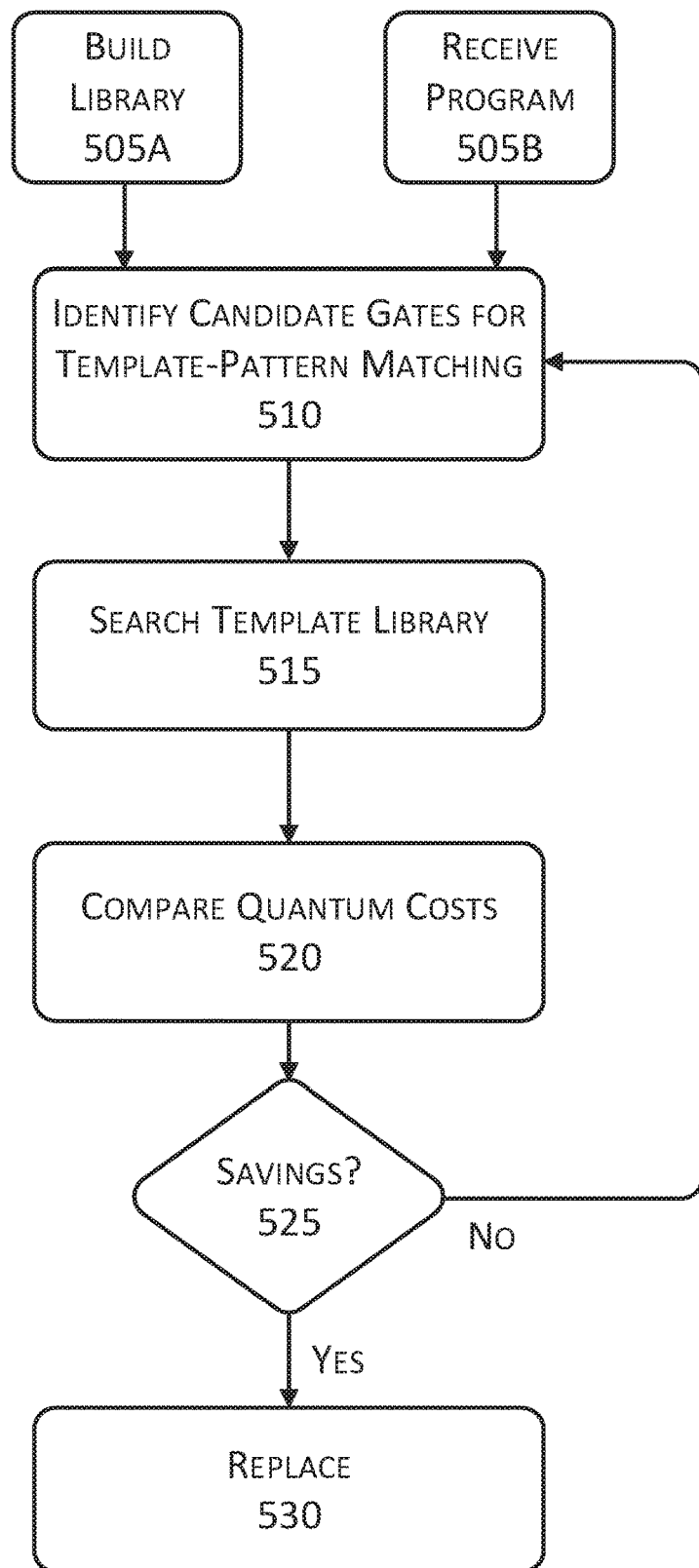
FIG. 5 shows an example processing flow to optimize a quantum circuit in a classical computing environment, arranged in accordance with at least some embodiments described herein.

FIG. 5 shows an example processing flow 500 by which at least portions of quantum circuit optimization may be implemented, in accordance with at least the embodiments and implementations of FIGS. 3 and 4, described above. As depicted, processing flow 500 includes sub-processes executed by various components of compiler 320 that may be included in system 300. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 505A, 505B, 510, 515, 520, 525, and 530. These various operations, functions, or actions may, for example, correspond to software, program code or program instructions executable by a processor that causes the functions to be performed. Processing may begin at either or both of block 505A or block 505B.

At block 505A (Build Library), library generator 410 may utilize a BFS tree to generate template library 410A. As set forth above, library 410A may refer to or include a gate library that stores one or more lists of possible gates for use in at least a portion of program 307.

Also, at block 505A, cost arbiter 415 may, concurrently or serially, determine the quantum cost of templates, as the respective templates are generated or as the respective templates are stored in library 410A. In accordance with at least one example implementation, cost arbiter 415 may utilize a customized scoring scale to assign costs to gates and/or sequences of gates as the corresponding templates are generated or stored.

At block 505B (Receive Program), receiver 405 may receive program 307 from source 305.

In accordance with the embodiments described herein, processing at block 505A and block 505B may be implemented concurrently or serially or with no predetermined order. Processing may proceed to block 510.

At block 510 (Identify Candidate Gates for Template-Pattern Matching), function arbiter 420 may perform a pattern search within received program 307.

At block 515 (Search Template Library), function arbiter 420 may perform a trial mapping of one or more templates stored in template library 410A into program 307. The pattern identification may be performed for one template at a time or for multiple templates in parallel. In accordance with at least some example implementations, the search may be implemented as a DAG search that builds candidate mapping from template qubits into circuit qubits. Processing may proceed to block 520.

At block 520 (Compare Quantum Costs), cost arbiter 415 may utilize an algorithm to determine the quantum cost of one or more templates stored in library 410A, if the corresponding quantum cost has not yet been determined; and cost arbiter 415 may utilize the same algorithm to determine the quantum costs for the patterns identified in program 307. That is, for each implementation, a common algorithm may be utilized to determine the quantum cost for a template as well as for the pattern that the template replaces. Processing may proceed to decision block 525.

At decision block 525 (Savings?), cost arbiter 415 may determine that a quantum cost of the replacement pattern of quantum gates is lower than a quantum cost of the identified pattern of quantum gates. Upon a negative determination, processing may return to block 510; upon positive determination, processing may proceed to block 530.

At block 530 (Replace), replacement manager 430 may modify the topology of program 107 by replacing the identified pattern of quantum gates with the replacement pattern of quantum gates.

The solutions depicted and described herein pertain to a fast technique for mapping templates into a target circuit included in program 307, and a fast technique for pattern-matching a stored template against a sub-set of gates in the target circuit. That is, given a quantum circuit in program 307 and a template stored in library 410A, function arbiter 420 determines whether the qubits of the stored template may be mapped to qubits of the quantum circuit. If the determination is positive, then the respective template is mapped to the circuit. Multiple iterations may be performed to capture cost reductions resulting from new patterns arising in the modified circuit.

Template patterns stored in library 410A may be mapped onto a target circuit included in program 307 by stepping through the circuit and stopping at the first gate that matches a gate pattern. This seeds the mapping from pattern qubits to target qubits. The other pattern qubits may be mapped by stepping from the seed gate along the DAG, first locating a gate that matches the next pattern gate and is connected via a control to the seed bit. A similar procedure may be performed for control bits. If a non-commuting gate is encountered, or not all qubits are mapped, the process may terminate and mapping for the next template may be performed.

Figure 6:
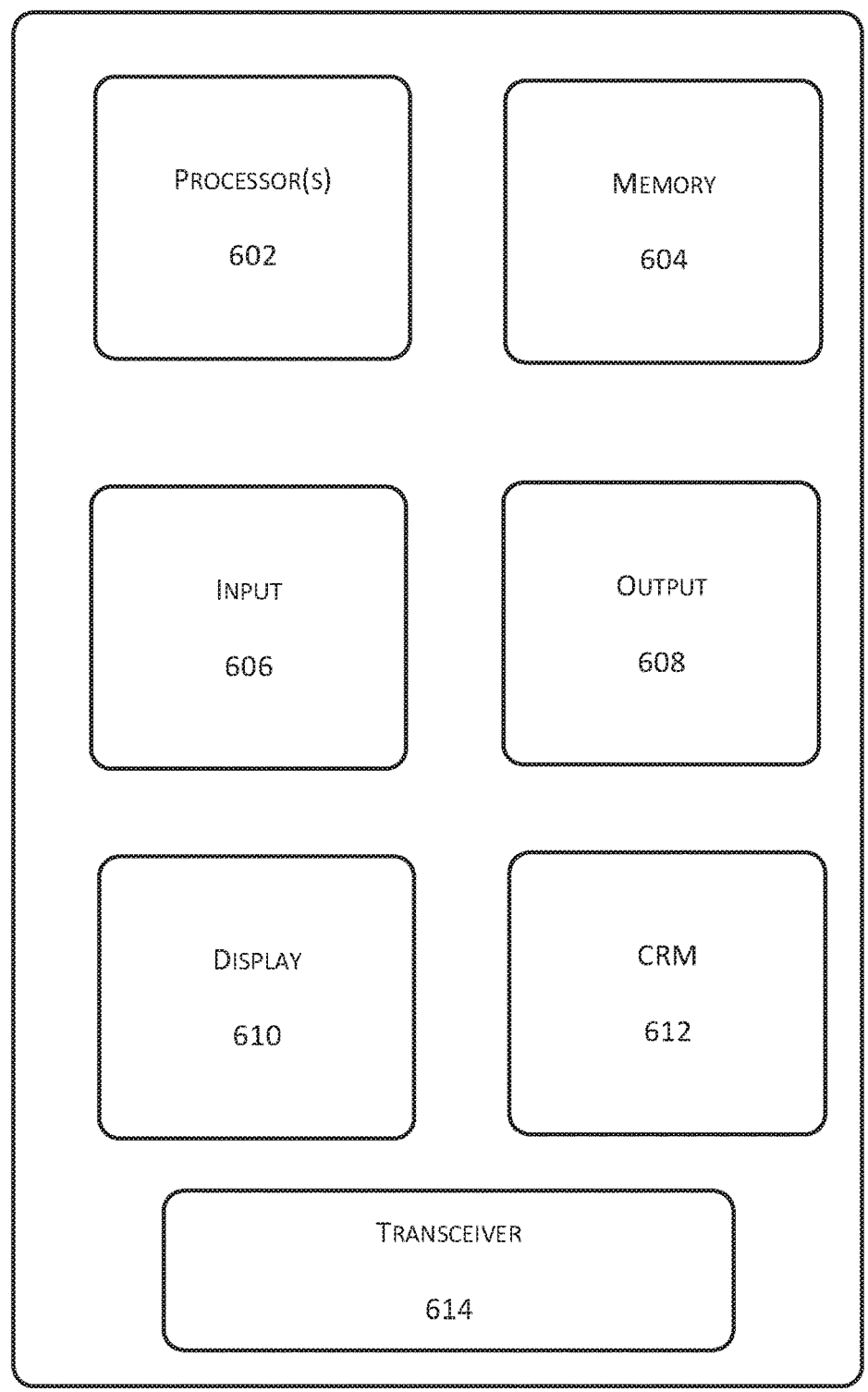
FIG. 6 shows an illustrative computing embodiment, in which any of the processes and sub-processes of optimizing a quantum circuit may be implemented as executable instructions stored on a computer-readable medium.

FIG. 6 shows an illustrative computing embodiment, in which any of the processes and sub-processes of quantum hybrid computation may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to systems 300 and 400 for quantum hybrid computation.

In a very basic configuration, a computing device 600 may typically include, at least, one or more processors 602, a system memory 604, one or more input components 606, one or more output components 608, a display component 610, a computer-readable medium 612, and a transceiver 614.

Processor 602 may refer to, e.g., a microprocessor, a microcontroller, a digital signal processor, or any combination thereof.

Memory 604 may refer to, e.g., a volatile memory, non-volatile memory, or any combination thereof. Memory 604 may store, therein, operating system 330, an application, and/or program data. That is, memory 604 may store executable instructions to implement any of the functions or operations described above and, therefore, memory 604 may be regarded as a computer-readable medium.

Input component 606 may refer to a built-in or communicatively coupled keyboard, touch screen, or telecommunication device. Alternatively, input component 606 may include a microphone that is configured, in cooperation with a voice-recognition program that may be stored in memory 604, to receive voice commands from a user of computing device 600. Further, input component 606, if not built-in to computing device 600, may be communicatively coupled thereto via short-range communication protocols including, but not limitation, radio frequency or Bluetooth.

Output component 608 may refer to a component or module, built-in or removable from computing device 600, that is configured to output commands and data to an external device.

Display component 610 may refer to, e.g., a solid-state display, that may have touch input capabilities. That is, display component 610 may include capabilities that may be shared with or replace those of input component 606.

Computer-readable medium 612 may refer to a separable machine-readable medium that is configured to store one or more programs that embody any of the functions or operations described above. That is, computer-readable medium 612, which may be received into or otherwise connected to a drive component of computing device 600, may store executable instructions to implement any of the functions or operations described above. These instructions may be complimentary or otherwise independent of those stored by memory 604.

Transceiver 614 may refer to a network communication link for computing device 400, configured as a wired network or direct-wired connection. Alternatively, transceiver 614 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A computer-implemented method of optimizing a quantum circuit, the method comprising:
    identifying, from a first set of quantum circuit gates, a second set of quantum circuit gates that perform a predetermined function;
    searching a library of templates stored on a non-transitory computer readable medium to find a template of quantum circuit gates that performs the predetermined function by compiling abstract gate operations into a set of hardware-specific operations that manipulate qubit states using qubit mapping and gate mapping to find a match, the gate mapping including matching a type and ordering of quantum circuit gates, defined over a graphical representation of the quantum circuit, between the quantum circuit and the template of quantum circuit gates; and
    replacing the identified set of quantum circuit gates with the found template of quantum circuit gates,
    wherein the method is executed in a pipeline in combination with a quantum circuit compilation and an additional quantum optimization.

2. The computer-implemented method of claim 1, wherein the template of quantum circuit gates has a lower quantum cost than the identified set of quantum circuit gates.

3. The computer-implemented method of claim 2, wherein the quantum cost of the identified quantum circuit gates and the quantum cost of the found template of quantum circuit gates are calculated using a same algorithm.

4. The computer-implemented method of claim 1, wherein the templates in the library of templates are generated with parallel gates to modify circuit topology.

5. The computer-implemented method of claim 1, wherein the method is performed automatically upon receiving the quantum circuit.

6. The computer-implemented method of claim 5, wherein the method is performed in a serial manner.

7. The computer-implemented method of claim 5, wherein the method is performed in a parallel manner.

8. A non-transitory computer-readable medium storing executable instructions that, upon execution, cause a digital computing processor, in a pipeline in combination with a quantum circuit compilation and an additional quantum optimization, to:
    receive a quantum circuit;
    identify, from within the received quantum circuit, a pattern of quantum gates that matches at least a part of at least one pattern from a pre-generated library of templates stored on a non-transitory computer readable medium coupled to the digital computing processor;
    search the library of templates for a replacement pattern of quantum gates by compiling abstract gate operations into a set of hardware-specific operations that manipulate qubit states using qubit mapping and gate mapping to find a match, the gate mapping including matching a type and ordering of quantum gates, defined over a graphical representation of the quantum circuit, between the quantum circuit and the template of quantum circuit gates;
    determine that a quantum cost of the replacement pattern of quantum gates is lower than a quantum cost of the identified pattern of quantum gates; and
    replace the identified pattern of quantum gates with the replacement pattern of quantum gates.

9. The computer-readable medium of claim 8, wherein the quantum cost of the identified pattern of quantum circuit gates and the quantum cost of the replacement pattern of quantum circuit gates are reduced by an abstract data structure.

10. The computer-readable medium of claim 9, wherein the quantum cost of the identified pattern of quantum circuit gates and the quantum cost of the replacement pattern of quantum circuit gates are assigned respective values in accordance with a customizable cost function.

11. The computer-readable medium of claim 8, wherein the replacement pattern of quantum circuit gates includes at least one quantum gate.

12. The computer-readable medium of claim 8, wherein the identified pattern of quantum gates is replaced with an identity operation.

13. The computer-readable medium of claim 8, wherein the digital computing processor searches the library at least partially on a GPU (graphics processing unit) and at least partially on a CPU (central processing unit).

14. An optimizer, comprising:
    a circuit configured to analyze a quantum circuit to identify a pattern of quantum gates that matches at least a part of a pattern from a previously generated library of templates;
    a library of templates stored on a non-transitory computer readable medium;
    a processor configured to execute instructions that cause the processor, in a pipeline in combination with a quantum circuit compilation and an additional quantum optimization, to:
        execute an algorithm to search for a replacement pattern of quantum gates,
        identify the replacement pattern of quantum gates to replace the identified pattern of quantum gates, when a quantum cost of the replacement pattern of quantum gates is determined to be less than a quantum cost of the identified pattern of quantum gates by compiling abstract gate operations into a set of hardware-specific operations that manipulate qubit states using qubit mapping and gate mapping between the pattern of quantum gates and the replacement pattern of quantum gates to find the match, the gate mapping including matching a type and ordering of quantum gates, defined over a graphical representation of the quantum circuit, between the quantum circuit and the template of quantum circuit gates, and
        replace the identified pattern of quantum gates with the replacement pattern of quantum gates.

15. The optimizer of claim 14, wherein the library stores abstract data structures that respectively represent the quantum cost of the identified pattern of quantum circuit gates and the quantum cost of the replacement pattern of quantum circuit gates.

16. The optimizer of claim 14, wherein the quantum cost of the identified pattern of quantum circuit gates and the quantum cost of the replacement pattern of quantum circuit gates are assigned respective values in accordance with a customizable cost function.

17. The optimizer of claim 14, wherein properties of respective patterns of quantum gates are modifiable.

18. The optimizer of claim 14, wherein the templates in the library of templates are generated with parallel gates to modify circuit topology.

19. The optimizer of claim 14, wherein the templates in the library of templates are generated with parallel gates to reduce quantum circuit depth.

* * * * *